United States Patent
Iwamoto

(10) Patent No.: US 9,028,364 B2
(45) Date of Patent: May 12, 2015

(54) CONTROL DEVICE FOR AUTOMATIC TRANSMISSION

(71) Applicants: Jatco Ltd, Fuji-shi, Shizuoka (JP); Nissan Motor Co., Ltd., Yokohama-shi, Kanagawa (JP)

(72) Inventor: Ikuhiro Iwamoto, Yokohama (JP)

(73) Assignees: Jatco Ltd, Fuji-Shi (JP); Nissan Motor Co., Ltd., Yokohama-Shi (JP)

( * ) Notice: Subject to any disclaimer, the term of this patent is extended or adjusted under 35 U.S.C. 154(b) by 0 days.

(21) Appl. No.: 14/358,436

(22) PCT Filed: Oct. 23, 2012

(86) PCT No.: PCT/JP2012/077280
§ 371 (c)(1),
(2) Date: May 15, 2014

(87) PCT Pub. No.: WO2013/073344
PCT Pub. Date: May 23, 2013

(65) Prior Publication Data
US 2014/0349813 A1 Nov. 27, 2014

(30) Foreign Application Priority Data

Nov. 18, 2011 (JP) .................................. 2011-253330

(51) Int. Cl.
| | | |
|---|---|---|
| *F16H 61/58* | (2006.01) | |
| *B60W 10/11* | (2012.01) | |
| *F16H 61/06* | (2006.01) | |
| *F16H 61/14* | (2006.01) | |
| *B60W 10/02* | (2006.01) | |
| *F16H 59/18* | (2006.01) | |
| *F16H 61/684* | (2006.01) | |
| *F16H 61/04* | (2006.01) | |

(52) U.S. Cl.
CPC ............... *B60W 10/11* (2013.01); *F16H 59/18* (2013.01); *F16H 61/061* (2013.01); *F16H 61/143* (2013.01); *F16H 61/684* (2013.01); *F16H 2061/0492* (2013.01); *F16H 2061/146* (2013.01); *B60W 10/02* (2013.01); *B60W 10/023* (2013.01)

(58) Field of Classification Search
USPC ......................................................... 477/63
See application file for complete search history.

(56) References Cited

U.S. PATENT DOCUMENTS 4,438,665 A * 3/1984 Schmidt ........................ 477/63
4,715,145 A * 12/1987 Takeda et al. .................. 477/63

(Continued)

FOREIGN PATENT DOCUMENTS

| JP | 08-145162 A | 6/1996 |
| JP | 2004-293710 A | 10/2004 |
| JP | 2008-138691 A | 6/2008 |

*Primary Examiner* — Dirk Wright
(74) *Attorney, Agent, or Firm* — Foley & Lardner LLP

(57) ABSTRACT

A control device of an automatic transmission comprises a torque converter and a lock-up clutch which are arranged between an engine and an automatic transmission; and an up-shift control means that, when an up-shift is required with an accelerator pedal kept depressed by a driver, lowers an engaging capacity of releasing side engaging elements engaged at a speed stage before a gear shifting and then increases an engaging capacity of engaging side engaging elements engaged at a speed stage after the gear shifting thereby to establish a power-on up-shift, wherein the up-shift control means is configured in that when the acceleration pedal is released from the driver during the time when the power-on up-shift is being carried out, the power-on up-shift is continued while lowering the engaging capacity of the lock-up clutch.

3 Claims, 4 Drawing Sheets

(56) References Cited

U.S. PATENT DOCUMENTS

| | | | |
|---|---|---|---|
| 5,303,616 A * | 4/1994 | Palansky et al. | 477/63 |
| 5,480,363 A * | 1/1996 | Matsubara et al. | 477/63 |
| 5,609,549 A | 3/1997 | Usuki et al. | |
| 7,601,094 B2 * | 10/2009 | Dickinson | 477/78 |

* cited by examiner

FIG.2

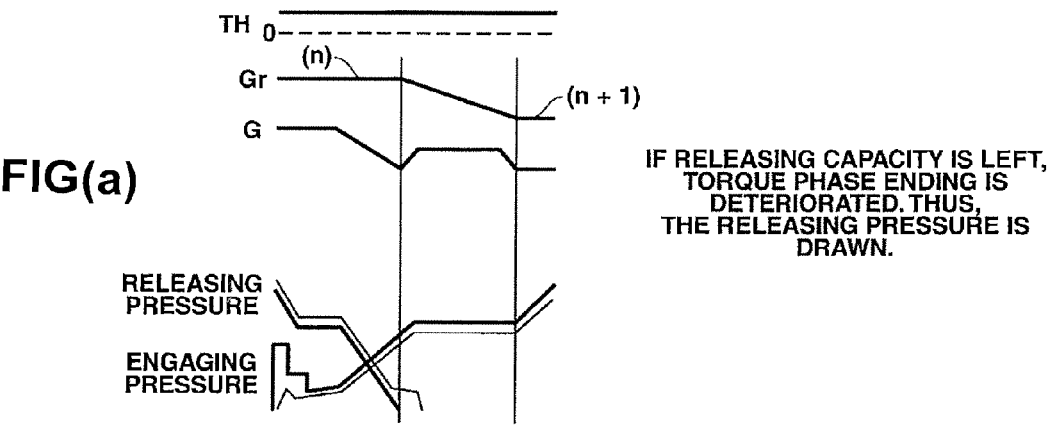

FIG(a) — IF RELEASING CAPACITY IS LEFT, TORQUE PHASE ENDING IS DETERIORATED. THUS, THE RELEASING PRESSURE IS DRAWN.

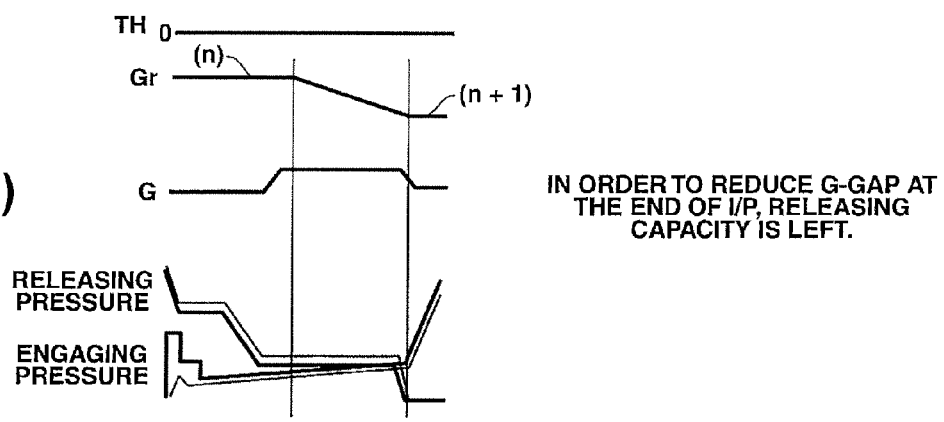

FIG(b) — IN ORDER TO REDUCE G-GAP AT THE END OF I/P, RELEASING CAPACITY IS LEFT.

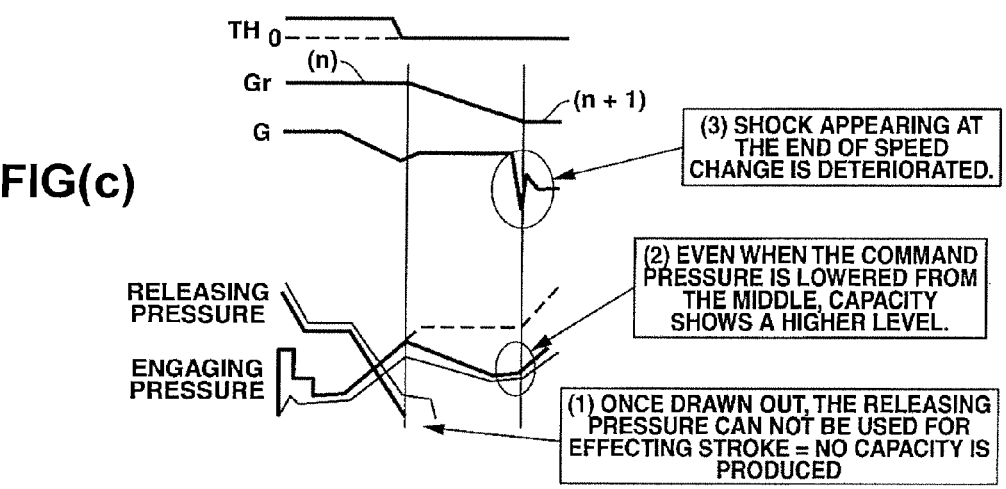

FIG(c)

(3) SHOCK APPEARING AT THE END OF SPEED CHANGE IS DETERIORATED.

(2) EVEN WHEN THE COMMAND PRESSURE IS LOWERED FROM THE MIDDLE, CAPACITY SHOWS A HIGHER LEVEL.

(1) ONCE DRAWN OUT, THE RELEASING PRESSURE CAN NOT BE USED FOR EFFECTING STROKE = NO CAPACITY IS PRODUCED

CONTROL DEVICE FOR AUTOMATIC TRANSMISSION

TECHNICAL FIELD

The present invention relates to a speed change control at the time of up-shift of an automatic transmission.

BACKGROUND ART

As is described in Patent Document-1, in case of to carrying out an up-shift with an accelerator pedal kept depressed by a driver (which will be referred to as power-on up-shift hereinafter), an inertia phase in which a change of gear ratio is actually made produces an inertial phase due to an engaging side clutch capacity for carrying out a speed change. While, in case of carrying out up-shift with the accelerator pedal released from the driver's foot (which will be referred to as power-off up-shift hereinafter), a control is so made as to extremely reduce an output shaft torque in the inertia phase for reducing a torque step difference (or shift shock) produced at the end of the inertial phase, because in such case an engine torque is low and thus the output shaft torque after establishing the up-shift becomes low. Accordingly, the engaging side torque capacity in the inertial phase is controlled to a very low capacity and furthermore the releasing side is forced to have a certain clutch capacity in the inertial phase, and at the end of the inertial phase, the engaging side capacity is increased while releasing the releasing side capacity. With such control, an output shaft torque at the end of the inertial phase becomes an engine coast torque, so that with production of the releasing side capacity in the inertial phase, the output shaft torque is reduced by an amount corresponding to the releasing side capacity thereby to reduce a torque step difference (shift shock) at the end of the inertial phase.

PRIOR ART DOCUMENTS

Patent Documents

Patent Document 1: Japanese Laid-open Patent Application (tokkai) 2004-293710

SUMMARY OF INVENTION

Problems to be Solved by Invention

When the power-on up-shift is changed to the power-off condition particularly in the inertia phase, the control has been very difficult causing a possibility of producing the shift shock. That is, although, for dealing with the reduction of engine torque, reduction of the engaging side clutch capacity can be thought out, it tends to occur that a hydraulic pressure fails to exhibit a satisfied response and thus the shift shock can not be sufficiently suppressed. Furthermore, since the output shaft torque is changed from positive state to negative state at the moment when the inertial phase ends, the shift shock can not be sufficiently suppressed particularly in case of an engine having a large coast torque.

Increase of the releasing side clutch capacity at the time when the power-on up-shift is changed to the power-off condition can be thought out like in case where the power-off up-shift is carried out from the beginning. However, in case of the power-on up-shift, making the releasing side clutch capacity zero in the inertia phase in view of the shift shock has been hitherto employed, and thus the piston is returned to its initial position during the power-on up-shift operation. Thus, it is very difficult to provide the releasing side clutch with a sufficient capacity by stroking the releasing side clutch again in a short time.

Furthermore, it can be also thought out that the engine torque is made positive in the inertial phase and the engine torque is changed to negative state at the end of the speed change. In this case, the engine torque goes out during the speed change and thus the speed change is slowly made, and particularly when the speed change is carried out in a high rotation speed range, the time-consuming speed change causes the driver to have a feeling of free running against his or her will, which is a new problem.

The present invention is provided by taking the above-mentioned problems into consideration and aims to provide a control device for an automatic transmission, which is able to reduce or improve the shift shock regardless of operation of an accelerator pedal by a driver.

Means for Solving Problems

In order to establish the above-mentioned object, the present invention provides a control device for an automatic transmission, which comprises a torque converter and a lock-up clutch which are arranged between an engine and the automatic transmission and an up-shift control means that, when an up-shift is required with an accelerator pedal kept depressed by a driver, lowers an engaging capacity of releasing side engaging elements engaged at a speed stage before the gear shifting and then increases an engaging capacity of engaging side engaging elements engaged at a speed stage after the gear shifting thereby to establish a power-on up-shift, wherein the up-shift control means is configured in that when the accelerator pedal is released from the driver during the time when a power-on up-shift is being carried out, the power-on up-shift is continued while lowering the engaging capacity of the lock-up clutch.

Effects of Invention

Accordingly, the shift shock can be suppressed while avoiding the slowed speed change and the feeling of free running.

BRIEF DESCRIPTION OF DRAWINGS

FIG. 2(a), FIG. 2(b) and FIG. 2(c) show amended time charts depicting a relation between an engaging capacity of engaging elements and an acceleration at the time of up-shifting.

EMBODIMENT FOR CARRYING OUT INVENTION

Figure 1:
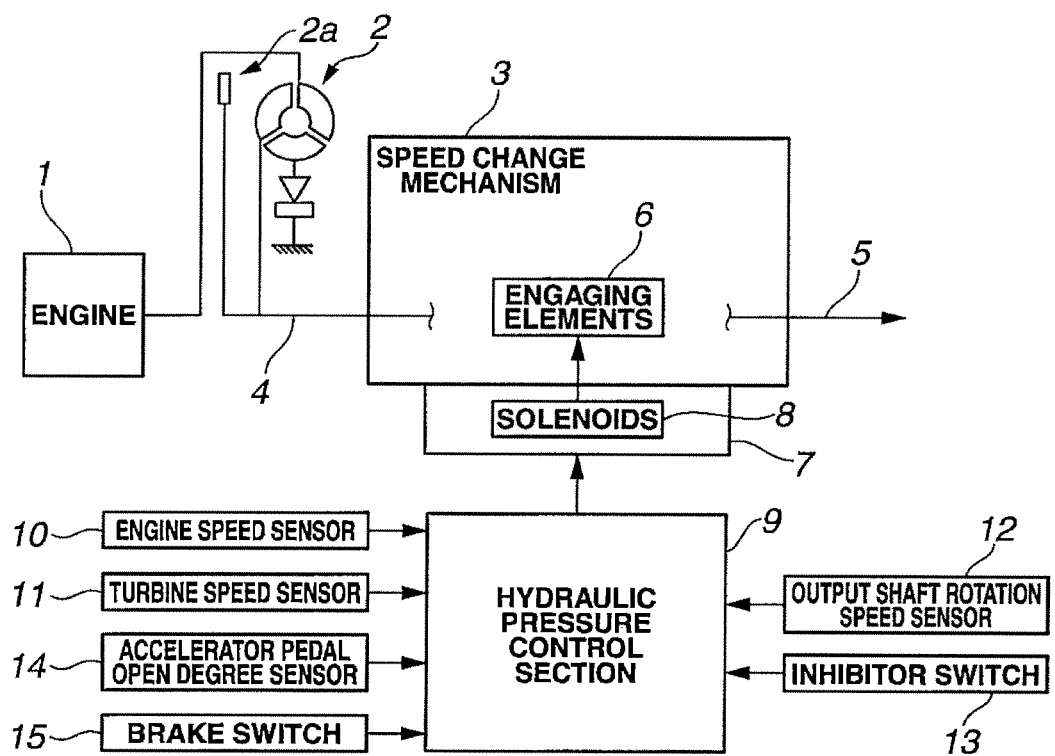
FIG. 1 is a schematic diagram showing a system configuration of an automatic transmission of a first embodiment.

FIG. 1 is a schematic diagram showing a system configuration of an automatic transmission of a first embodiment. an engine 1 is connected through a torque converter 2 to a speed change mechanism 3 of an automatic transmission. An output of the engine 1 is increased or reduced by a throttle valve that is connected to an accelerator pedal actuated by a driver and turned from a full close position toward a full open position while increasing an opening degree, and an output rotation of the engine 1 is inputted through the torque converter 2 to an input shaft 4 of the speed change mechanism 3. The torque converter 2 has a known construction having such a function that by producing a difference between an input rotation and an output rotation, an output torque of the engine 1 is amplified. The torque converter 2 is equipped with a lock-up clutch 2a that suppresses a difference between an input rotation and an output rotation, in other words, the lock-up clutch is able to directly connect the engine 1 and the speed change mechanism 3 while suppressing the torque converter from exhibiting the torque amplifying function.

The speed change mechanism 3 is constructed to have input and output shafts 4 and 5 that are coaxially arranged and front and rear planetary gear units (not shown) that are arranged on the input and output shafts, and by selecting the combination of engaging/releasing of a plurality of engaging elements 6 that are hydraulically actuated, power transmission paths of the mechanism 3 are changed to obtain a desired speed stage.

In a valve body 7, there are formed fluid passages (not shown) through which a hydraulic pressure is fed to the engaging elements 6, and solenoids 8 actuated based on instructions inputted thereto from a hydraulic pressure control section 9 control pressure regulating valves (not shown) respectively connected to the fluid passages, so that a hydraulic pressure of command value set by the hydraulic pressure control section 9 is applied to desired engaging elements. In traveling of an associated vehicle, the control is so made that for establishing a desired gear ratio, only the engaging element necessary for the speed change is fed with the hydraulic pressure.

Based on outputs from an engine speed sensor 10 that detects an engine speed, a turbine speed sensor 11 that detects a rotation speed of the input shaft 4, an output shaft rotation speed sensor 12 that detects a rotation speed of the output shaft 5 (which corresponds to a vehicle speed), an inhibitor switch 13 that detects an operation condition of a shift lever actuated by a driver, an accelerator pedal open degree sensor 14 that detects an open degree of an accelerator pedal actuated by the driver and a brake switch 15 that detects an operation condition of a brake pedal actuated by the driver, the hydraulic pressure control section 9 decides a command value of operating fluid pressure fed to the engaging elements that are to be engaged. Then, the control section issues instructions for driving the solenoids 8 so that the hydraulic pressure of the decided command value is fed to the engaging elements.

In the following, both power-on up-shift process and power-off up-shift process that are carried out in the automatic transmission of the first embodiment will be explained. FIG. 2 shows time charts depicting a relation between an engaging capacity of engaging elements and an acceleration at the time of up-shifting. In the following explanation, for completing an up-shifting from n-speed stage to (n+1)-speed stage, releasing side engaging elements, which have been engaged in the n-speed stage, are released and engaging side engaging elements, which have been released in the (n+1)-speed stage, are engaged.

(Power-On Up-Shift Process)

FIG. 2(*a*) is a time chart showing a relation between an engaging capacity of each engaging element and an acceleration at the time of carrying out the power-on up-shift. When an up-shifting is required with an accelerator pedal kept depressed by a driver, the hydraulic pressure for the releasing side engaging elements is reduced to a level that assures the lowest engaging capacity (viz., lowest engaging capacity that is able to prevent engine racing). During this, in each of the engaging side engaging elements, a play-suppression operation is applied to a piston by a pre-charging in which a higher command pressure is temporarily is outputted. Then, since the engine 1 is outputting a positive torque, the engaging capacity of the releasing side engaging elements is instantly or quickly removed to reduce a draw-shock (viz., reduction in acceleration) in a torque phase as much as possible to increase the capacity of the engaging side engaging elements for advancing the inertia phase. In other words, if the inertia phase is taken during the time when the engaging capacity of the releasing side engaging elements is left, the draw (or removing) of the torque phase is deteriorated, so that it is effective to quickly remove the engaging torque of the releasing side engaging elements.

(Power-Off Up-Shift Process)

FIG. 2(*b*) is a time chart showing a relation between an engaging capacity of each engaging element and an acceleration at the time of carrying out the power-off up-shift. When an up-shifting is required with an accelerator pedal kept released from a driver's foot, the hydraulic pressure of the releasing side engaging elements is reduced to a level that assures the lowest engaging capacity and then, in the engaging side engaging elements, a pre-charging is carried out like in case of the above-mentioned power-on up-shift process. Since the engine 1 is outputting a negative torque caused by frictions or the like without outputting a positive torque, the inertial phase is advanced while leaving the engaging capacity of the releasing side engaging elements in order to avoid a sudden reduction in engine rotation speed until the time when the engaging capacity of the engaging side engaging elements is assured. If the engaging capacity of the releasing side engaging elements is instantly removed, it is necessary to instantly increase the engaging capacity of the engaging side engaging elements upon completion of the speed change, which increases an acceleration change.

(In Case where Power-On Up-Shift Process Changes to Power-Off Process)

In the following, premising that the power-on up-shift and power-off up-shift have the above-mentioned controlled processes, a case in which during the power-on up-shift process a driver releases an accelerator pedal will be described.

FIG. 2(*c*) is a time chart showing a relation between an engaging capacity of each engaging element and an acceleration in a case wherein during the power-on up-shift process, the power-off is carried out. At first, due to the nature of the power-on up-shift process, the same process as that of FIG. 2(*a*) is carried out. When, during this process, a driver releases an accelerator pedal at the time when the engaging capacity of the releasing side engaging elements becomes almost zero, it is preferable to change the process to the power-off up-shift process. Thus, it is preferable to increase the engaging capacity of the releasing side engaging elements and reduce the engaging capacity of the engaging side engaging elements. However, once the releasing side engaging elements are released, it becomes necessary to make a play-suppression operation to each releasing side engaging element even when thereafter feeding of the hydraulic pressure thereto is intended, because the piston for each releasing side engaging element has moved to the releasing position due to the work of a return spring or the like. Accordingly, when considering a hydraulic response, it is very difficult to increase the engaging capacity of the releasing side engaging elements to a satisfied level. While, in case of the engaging capacity of the engaging side engaging elements, once the capacity is increased, a subsequent output of a lower command value tends to output a higher engaging capacity of the engaging side engaging elements. As a result of this tendency, all of the engaging side engaging elements are instantly engaged upon completion of the speed change, which tends to bring about an undesirable sudden acceleration change.

Accordingly, in the first embodiment, in order to solve the above-mentioned drawback, releasing the lock-up clutch 2a is suitably used. That is, upon power-off, the engine 1 outputs a negative torque that is a primary factor for instantly increasing a shift speed. By carrying out a power-off coping process at the time when the power-on up-shift is being carried out, that is, by releasing the lock-up clutch 2a to control not to transmit the negative torque of the engine 1 to the speed change mechanism 3, the shift speed is slowed and thus the acceleration change is suppressed.

In case where a vehicle travelling fulfills a predetermined running condition for improvement in fuel consumption, the lock-up clutch 2a is fully engaged, and in case where a speed change is carried out, the lock-up clutch is engaged with a predetermined engaging capacity while permitting a relative rotation owing to a slip lock-up controlling. Accordingly, during the speed change, there are a case where the clutch is fully engaged and a case where the clutch is sliply (or slidably) engaged due to the slip lock-up controlling. Thus, in such cases, releasing the lock-up clutch 2a includes a case where the clutch is released from the fully engaged condition, a case where the clutch is released from the slip-lock up condition and a case where the clutch is not fully released but the clutch is so controlled that the lock-up clutch engaging capacity thereof is lowered to a predetermined engaging capacity.

Figure 3:
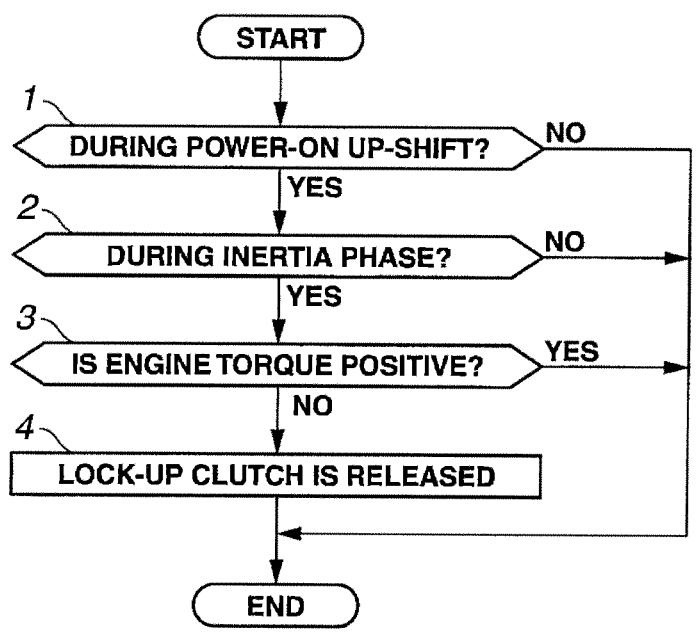
FIG. 3 is a flowchart depicting a power-off coping process executed at the time when the power-on up-shift is carried out in the first embodiment.

FIG. 3 is a flowchart depicting a power-off coping process executed at the time when the power-on up-shift is carried out.

At step S1, judgment is carried out as to whether a power-on up-shift is being carried out or not. When it is judged that the power-on up-shift is being carried out, the control flow goes to step S2, while when other conditions are judged to be present, the control flow is finished.

At step S2, judgment is carried out as to whether the present phase is an inertia phase or not. When it is judged that the present phase is the inertia phase, the control flow goes to step S3, while when other phases are judged to be present, the control flow is finished. A torque phase means a condition in which the engaging capacity of the releasing side engaging elements is still not removed completely, and thus, when the direction of engine torque is reversed, it becomes necessary to prevent an excessive lowering of engine rotation speed with the aid of the engaging capacity of the releasing side engaging elements. Furthermore, for avoiding a shift shock, releasing of the lock-up clutch 2a has to be made while the releasing side engaging elements are under a slipping condition.

At step S3, judgment is carried out as to whether the engine torque is positive or not. When it is judged that the engine torque is negative, the control flow goes to step S4, while if so, that is, when it is judged that the engine torque is positive, the control flow is finished. The judgment as to whether the engine torque is positive or negative is carried out by judging whether or not a corresponding value is larger than a predetermined value, which brings about judgment of "positive". If desired, the predetermined value may be set to 0 (zero). If the positive torque is kept outputted, a situation in which instant engagement by the work of the engaging side engaging elements can be avoided.

At step S4, the lock-up clutch 2a is released.

Figure 4:
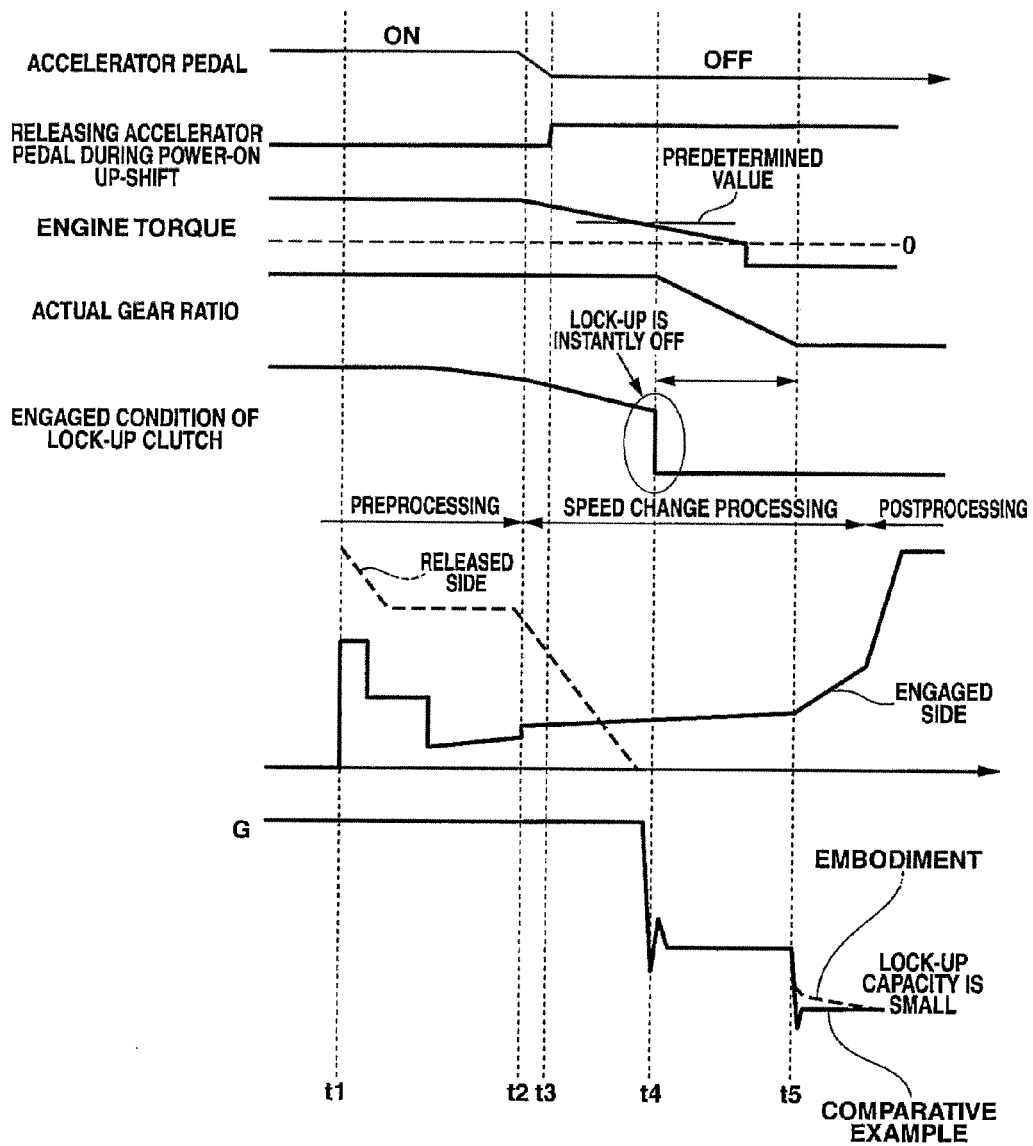
FIG. 4 is a time chart depicting the power-off coping process executed at the time when the power-on up-shift is carried out in the first embodiment.

In the following, operation based on the above-mentioned control flow will be described. FIG. 4 is a time chart depicting the power-off coping process executed at the time when the power-on up-shift is carried out in the first embodiment.

At time t1, a request for the power-on up-shift to carry out an up-shift having an accelerator pedal kept depressed by a driver is outputted. Upon this, as has been explained in the section of FIG. 2(a), the releasing side engaging elements are released, and after a pre-charging is applied to the engaging side engaging elements, the engaging capacity is gradually increased to promote the progress of the inertia phase.

When the driver releases the accelerator pedal at time t2, judgment is so made that a foot release action during the power-on up-shift process is carried out at time t3. At this stage, the engine torque is still positive (the value is equal to or larger than a predetermined value inducing the possibility of judging "positive") and the inertia phase does not start, and thus, the speed change control taken during the power-on up-shift process is temporarily continued and no action is made to the lock-up clutch 2a.

At a point in time appearing in a period from time t3 to time t4, the engine torque becomes smaller than a predetermined value at which the engine torque can be judged "positive". However, at the point in time, the Inertia phase does not start yet, and thus, the speed change control taken during the power-on up-shift is continued and no action is applied to the lock-up clutch 2a. Then, when the inertial phase starts at time t4, the lock-up clutch 2a is instantly released since the engine torque has become lower than the predetermined value at which the engine torque can be judged "positive". With this, no negative torque can be inputted to the speed change control mechanism 3 from the side of the engine 1.

When the inertia phase is finished at time t5, the engaging capacity of the engaging side engaging elements is increased. Since the lock-up clutch 2a has been released at this time, undesired draw-shock which would be induced by the engagement of the engaging side engaging elements is suppressed. If the lock-up clutch 2a is not kept released, the draw-shock is produced due to the negative torque.

As is described hereinabove, in the first embodiment, the following operation effects are obtained.

(1) In a control device of an automatic transmission, which comprises a torque converter 2 and a lock-up clutch 2a which are arranged between an engine 1 and a speed change mechanism 3 (automatic transmission) and a hydraulic pressure control section 9 (up-shift control means) that, when an up-shift is required with an accelerator pedal kept depressed by a driver, lowers an engaging capacity of releasing side engaging elements engaged at a speed stage before the gear shifting and then increases an engaging capacity of engaging side engaging elements engaged at a speed stage after the gear shifting thereby to establish the up-shift, the hydraulic pressure control section 9 is configured in that when the acceleration pedal is released from the driver during the time when a power-on up-shift is being carried out, the power-on up-shift is continued while lowering the engaging capacity of the lock-up clutch 2a.

With this, a shift shock can be suppressed while avoiding a slowed speed change and a feeling of free running.

(2) Due to provision of step S3 (torque judging means) at which judgment as to whether the torque of an engine 1 is positive or negative is carried out, the hydraulic pressure control section 9 starts to lower the engaging capacity of the lock-up clutch 2a when the step S3 judges that the engine torque is negative.

Due to release of the lock-up clutch 2a, no load is applied to the engine 1, and thus undesired engine racing can be suppressed.

(3) When it is judged that the torque of the engine 1 is positive until the time when an inertia phase induced by the power-on up-shift is finished, the hydraulic pressure control section 9 refrains from lowering the engaging capacity of the lock-up clutch.

Accordingly, undesired shift shock can be suppressed while avoiding engine racing.

The invention claimed is:

1. A control device of an automatic transmission, comprising:
   a torque converter and a lock-up clutch which are arranged between an engine and an automatic transmission; and
   an up-shift control means that, when an up-shift is required with an accelerator pedal kept depressed by a driver, lowers an engaging capacity of releasing side engaging elements engaged at a speed stage before a gear shifting and then increases an engaging capacity of engaging side engaging elements engaged at a speed stage after the gear shifting thereby to establish a power-on up-shift,
   wherein the up-shift control means is configured in that when the acceleration pedal is released from the driver during the time when the power-on up-shift is being carried out, the power-on up-shift is continued while lowering the engaging capacity of the lock-up clutch.

2. A control device of an automatic transmission as claimed in claim 1, further comprising a torque judging means that carries out judgment as to whether the torque of the engine is positive or negative, wherein the up-shift control means starts to lower the engaging capacity of the lock-up clutch when the torque judging means judges that the engine torque is negative.

3. A control device of an automatic transmission as claimed in claim 2, in which when it is judged that the torque of the engine is positive until the time when an inertia phase induced by the power-on up-shift is finished, the up-shift control means refrains from lowering the engaging capacity of the lock-up clutch.

* * * * *